(135.)    J. K. PRIEST & R. T. SMITH.
Improvement in Clipping Shears.
No. 122,852.    Patented Jan. 16, 1872.
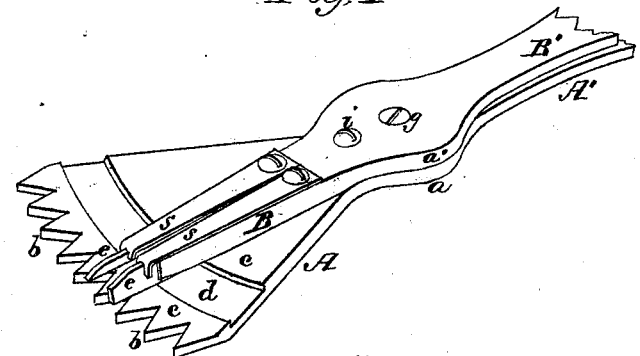
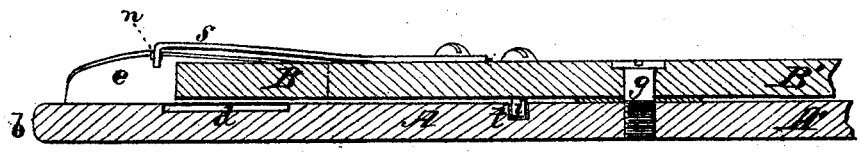
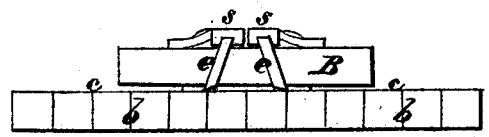
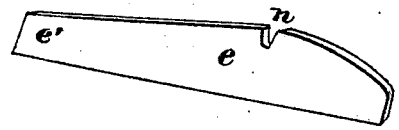

No. 122,852

UNITED STATES PATENT OFFICE.

JOSEPH K. PRIEST AND ROSWELL T. SMITH, OF NASHUA, NEW HAMPSHIRE, ASSIGNORS TO THEMSELVES, WILLIAM EARL, AND JAMES G. BLUNT, OF SAME PLACE.

IMPROVEMENT IN CLIPPING-SHEARS.

Specification forming part of Letters Patent No. 122,852, dated January 16, 1872.

*To all whom it may concern:*

Be it known that we, JOSEPH K. PRIEST and ROSWELL T. SMITH, of Nashua, in the county of Hillsborough and State of New Hampshire, have invented certain Improvements in Machines for Clipping Horses and Sheep; and we do hereby declare that the following is a full, clear, and exact description thereof, reference being had to the accompanying drawing making part of this specification, in which—

Figure 1 is a perspective view of the instrument with the handle portion broken away. Fig. 2 is a section taken vertically and longitudinally through the machine. Fig. 3 is an end view. Fig. 4 shows one of the vibrating cutters detached from the machine.

Similar letters of reference indicate corresponding parts in the several figures.

This invention relates to clipping-machines wherein laterally-vibrating cutters are employed in combination with a cutter-plate of a segmental form, which presents a number of right and left cutting-edges, as will be hereinafter explained.

The following description of our invention will enable others skilled in the art to understand it.

The cutter-plate A, on which the cutters vibrate, is of a segmental form, and presents on its curved edge a number of right and left cutting-teeth, $b$. From the toothed edge $b$ the edges of the plate A converge to an enlarged portion, $a$, which terminates in a handle or stock, A'. The upper surface of this cutter-plate is flat, and just in rear of the roots of the cutters $b$ a groove, $d$, is made into the plate for the purpose of allowing a free escape of fibers, which might work backward beneath the edges of vibrating cutters $e$, thus preventing undue friction between the latter and surface of plate A. The vibrating cutters $e$ are long strips of steel, the lower cutting-edges of which are beveled and pressed upon the surfaces $c$ on both sides of the groove $d$. The upper edges of the cutters $e$ are notched at $n$, and from this point backward to their extremities they are tapering, as clearly shown in Fig. 4. The tails $e'$ of the cutters $e$ are fitted into sockets which are made into the end of a cutter-stock, B, which vibrates about a pivot, $g$, and which terminates in a handle, B'. The enlargement $a'$ of the cutter-stock corresponds in shape to the enlargement $a$ of the cutter-plate A, and between these two enlargements a washer is applied to slightly separate the parts A B, as shown in Fig. 2. The sockets or kerfs in the end of the cutter-stock B for receiving the tails of the cutters $e$ are inclined toward each other; consequently the cutters $e$ $e$ will also assume inclined positions to the surfaces $c$ on which they work; the lower edges of these cutters $e$ are therefore beveled somewhat like the cutting-edges of shear-blades. When the cutters $e$ are slipped into their sockets they are held therein, and at the same time pressed down upon the surface of the cutter-plate A both in front and rear of the groove $d$ by means of hooked springs $s$ $s$, the hooked ends of which are notched and received into the notches $n$ $n$ of the cutters $e$. A stop-pin, $i$, on the stock B, works in a groove, $t$, in the upper side of the cutter-plate A, and limits the amount of vibration of the cutter-stock. The cutters $e$ $e$ work freely up and down in their sockets, but are resisted in their upward movements by the springs $s$ $s$, which exercise sufficient force to keep the cutting-edges down to their work under all ordinary circumstances. Under any undue strain the springs $s$ will yield and prevent derangement of the parts. These springs, which can be adjusted by their set-screws, allow a ready removal of the cutters $e$ when it is desired to sharpen their edges. The ends of the springs act upon the cutters nearest their outer ends; hence the cutting-edges are pressed down upon the cutting-teeth $b$ with considerable force, while the tails of the cutters are held down upon the surface $c$ back of the clearing-groove $d$ with all the force requisite to prevent their springing up under ordinary circumstances. Thus it will be seen that the entire length of the lower beveled edge of each cutter $e$ is made to fit accurately the surfaces $c$, on which it vibrates; also that all foreign matters, as well as wool or hair, which might work back of the cutters $b$, will be received into the groove $d$ and escape therefrom, so as not to clog the cutters; also that the cutters operate alternately in cutting, and scrape or clear in going backward, for when one cutter is cutting the other is scraping, and vice versa. Instead of arranging the cutters $e\ e$ in oblique sockets they may be applied in sockets which are perpendicular to the surface $c$, and their cutting-edges formed by beveling the sides of the blades. In either case the cutters present at the points of their impingement on the surface of plate A sharp cutting-edges; no other parts of the cutters act on plate A; consequently the only friction produced will be at the points of cutting. Instead of applying springs directly to the cutters $e$, as above set forth, the cutters may be secured into their vibrating head by set-screws, and the necessary spring given to them through the head. Both cutters can be applied into a single socket, each being acted on by a single spring or being held by a set-screw. The cutters presenting a straight cutting-edge, this edge can be readily and quickly ground, which is one of the advantages attending our improved machine.

Having described our invention, what we claim as new, and desire to secure by Letters Patent, is—

1. The removable cutter $e$, with its tail $e'$ beveled and adjusted upon the surface of the cutter-plate A, substantially as described.

2. The cutter $e$ fitted loosely into a vibrating head or arm, B, and held down upon the cutter-plate A by an elastic yielding device, substantially as described.

3. The cutter $e$, notched at $n$ so as to be held in its socket, as well as held down to its work by means of a hooked spring, $s$, substantially as described.

4. The independently-removable vibrating cutters $e\ e$, arranged to cut alternately right and left, and combined with a cutter-plate, A, substantially as and for the purpose described.

JOSEPH K. PRIEST.
ROSWELL T. SMITH.

Witnesses:
WM. EARL, Jr.,
FRANK A. McKEAN. (135)